United States Patent [19]

Sakashita et al.

[11] Patent Number: 4,886,533

[45] Date of Patent: Dec. 12, 1989

[54] GAS FILTER

[75] Inventors: Kimiaki Sakashita, Funabashi; Masaaki Kouno, Matsudo; Hideo Tsukazaki, Toride, all of Japan

[73] Assignee: Nihon Cement Co., Ltd., Tokyo, Japan

[21] Appl. No.: 251,186

[22] Filed: Sep. 29, 1988

[30] Foreign Application Priority Data

Jul. 5, 1988 [JP] Japan ............................ 63-89353[U]

[51] Int. Cl.[4] ............................................ B01D 46/10

[52] U.S. Cl. ........................................ 55/498; 55/502; 55/509; 55/523

[58] Field of Search ................ 55/498, 502, 509, 484, 55/523; 210/446, 448, 315

[56] References Cited

U.S. PATENT DOCUMENTS 3,170,872 2/1965 Balogh et al. ....................... 210/315
3,300,050 1/1967 Perry ................................. 210/446
3,386,230 6/1968 Riesberg et al. ...................... 55/498
4,372,847 2/1983 Lewis ................................. 210/315
4,791,785 12/1988 Hudson et al. ........................ 55/523

FOREIGN PATENT DOCUMENTS 1216783 4/1960 France ............................... 210/448

*Primary Examiner*—Bernard Nozick
*Attorney, Agent, or Firm*—Toren, McGeady & Associates

[57] ABSTRACT

A gas filter that has a simple structure and maintain the sealing effect of sealing members even at a high temperature is disclosed. The gas filter comprises a case with a gas inlet and a gas outlet, a ceramic filter placed in the case, sealing members for sealing gaps between the case and the filter and also for directing gas entering from the gas inlet so as not to bypass the filter before exiting, and an elastic member placed in the case for pressing the sealing members to ensure unfailing sealing.

4 Claims, 4 Drawing Sheets

GAS FILTER

FIELD OF THE INVENTION AND RELATED ART STATEMENT

The present invention relates to a gas filter, more particularly to a gas filter suitable for filtering dry gas used for semiconductors.

Recently, along with remarkable advances in semiconductor devices, patterns are becoming increasingly minute and layers are becoming thinner. Consequently, the number of particles in various gases used in manufacture of semiconductor devices has to clear ever more stringent requirements every year and is now at the level of 5 particles (larger than 0.3 μm) per $ft^3$ or less.

In view of the above situation, use of ceramic filters has been disclosed in, for example, Japanese Utility Model Provisional Publication No. 191115/1986.

As shown in FIGS. 6 and 7, such ceramic filters have a case 106 having a gas inlet opening 104 and a gas outlet opening 105 at its upper and bottom ends, respectively. This case 106 contains a cylindrical ceramic filter 101 or a cylindrical ceramic filter 103 with a large number of flow holes bored into it. Between the ceramic filter 101 or 103 and the case 106, there is provided sealing members 107,108 so that gas flowing in through the inlet opening 104 is forced to pass through the filter 101 or 103 before exiting from the outlet opening 105.

In the conventional gas filters described above, a large load is applied when the ceramic filter 101 or 103 is placed in the case 106 in order to make the sealing members 107,108 function effectively and ensure firm contact between the ceramic filter 101 and 103 and the sealing members 107,108. This large loading, however, may cause the filters 101,103 to break.

Also, when high temperature gas such as at the temperature of 300° C. is filtered, the sealing by the sealing members 107,108 often deteriorates due to heat deformation of the sealing members 107,108 or a difference in heat expansion between the ceramic filters 107,108 and the case 106, causing the gas to bypass the filter 101 or 103 before flowing out of the outlet opening 105.

OBJECT AND SUMMARY OF THE INVENTION

The present invention has been made in view of the above problems found in the conventional art. It is an object of the present invention to provide a gas filter that has a simple structure and can maintain effective sealing by sealing members even at a high temperature.

In order to solve the above problems, the present invention provides a gas filter essentially comprising a case having gas inlet and outlet openings, a ceramic filter placed in the case for filtering the incoming gas, sealing members that seal gaps between the ceramic filters and the case so that the gas flowing into the case through the inlet opening is forced to flow through the ceramic filter before exiting from the outlet opening, an elastic member disposed in the case for pressing the sealing members in a direction that ensures constant sealing by the sealing members.

According to the present invention, as described above, high temperature gas can be treated efficiently without fear, even at a high temperature, of gaps between the ceramic filter and the sealing members because the elastic member is constantly pressing the sealing members in a direction to ensure unfailing sealing.

Also, during manufacture, very large loading becomes unnecessary for better sealing by the sealing members, and the breakage of the ceramic filter can now be prevented.

BRIEF DESCRIPTION OF THE DRAWINGS

FIG. 1 shows a half sectional view of a gas filter of the present invention;

FIG. 2 shows a sectional view of the gas filter along the A—A line in FIG. 1;

FIG. 3 is a schematic sectional view of the gas filter;

FIGS. 4 and 5 are schematic views showing other embodiments of the gas filter of the present invention;

FIGS. 6(*a*) and 7(*a*) are half sectional views of the conventional gas filters; and FIGS. 6(*b*) and 7(*b*) are sectional views along the B—B line in FIG. 6(*a*) and along the C—C line in FIG. 7(*a*), respectively.

DETAILED DESCRIPTION OF PREFERRED EMBODIMENTS

Below, the present invention will be explained in detail with reference to the attached drawings.

Figure 1:
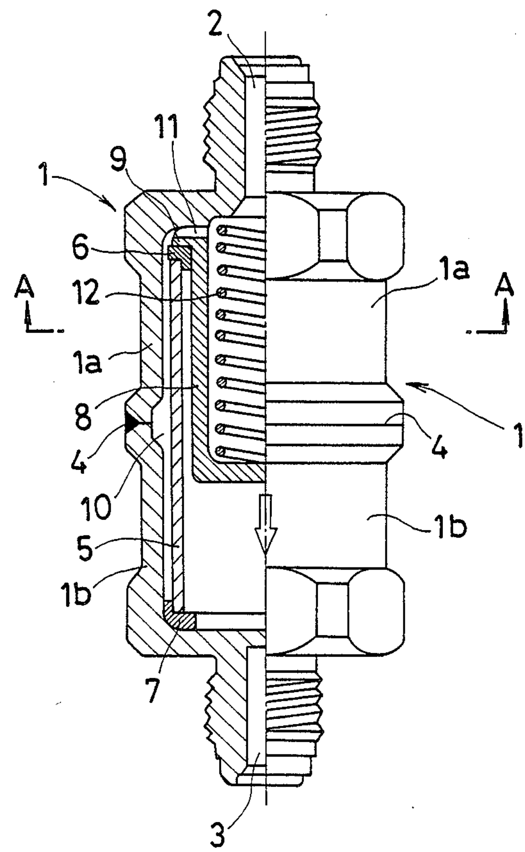
FIGS. 1 to 5 show embodiments of the present invention.
Figure 2:
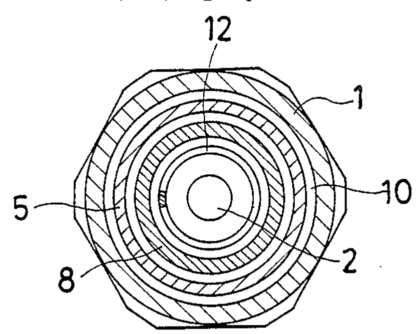

In FIGS.1 and 2, reference numeral 1 indicates a cylindrical (or nearly cylindrical) case having a gas inlet opening 2 at its upper end and a gas outlet opening 3 at its bottom end. This case 1 can be formed by welding two cylindrical cases with a bottom 1a,1b together so that the welding point would be at the center 4 of the case. A ceramic filter 5 is placed in the case 1 so as to have a gap 10 around its periphery and can be made by forming porous ceramic structural material into a cylindrical shape. Sealing members 6,7 are disposed between the ends of above ceramic filter 5 and the case 1 in such a way that gas flowing into the case 1 from the inlet opening 2 is forced to pass through the ceramic filter before exiting from the outlet opening 3. The sealing members 6,7 may be rings made of fluorine contained resin.

A cylindrical receiving member 8 with a bottom for receiving an elastic member has a flange 9 around its opening, and the flange 9 has a groove 11 for directing the gas flowing in through the inlet opening 2 to the gap 10 formed between the outer wall of the ceramic filter 5 and the inner wall of the case 1.

A spring 12 is placed in the receiving member 8 for receiving the elastic member and is designed to be slightly longer than the depth of the receiving member 8 so that the spring 12, as placed in the receiving member 8, constantly presses the receiving member 8 down for secured sealing by the sealing members 6,7 as the sealing members 6,7 are in turn pressed to the ceramic filter 5.

Figure 3:
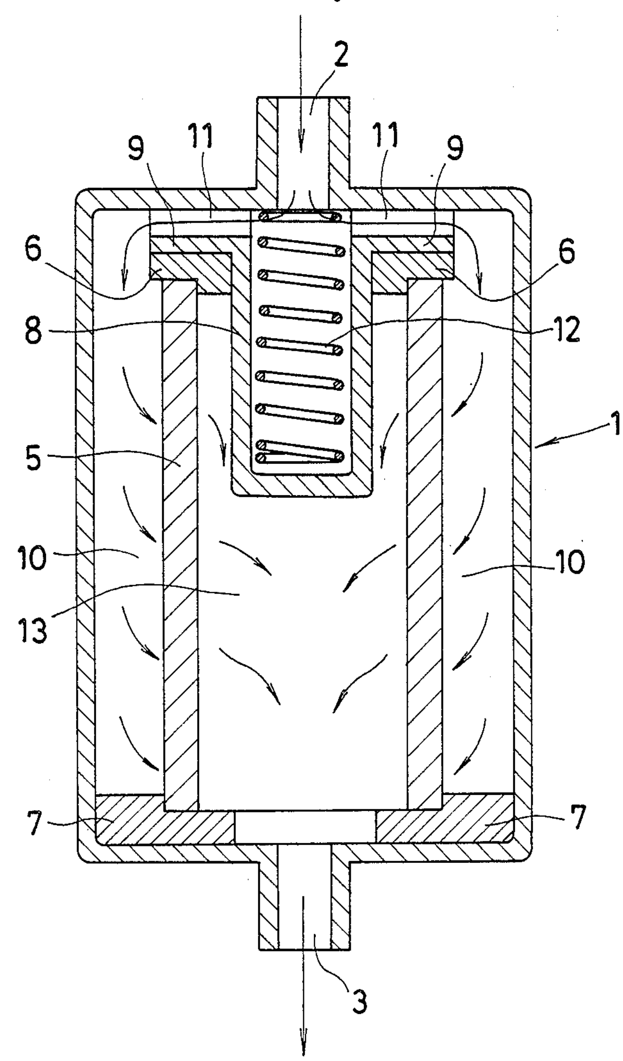

Effects of the gas filter of the present invention will be explained below with reference to FIG.3. Gas flowing in through the gas inlet opening 2 is directed to the gap 10 through the groove 11 formed on the flange 9 of the receiving member 8. The gas is filtered by passing through the wall of the ceramic filter 5 to be purified. It should be noted, at this point, that the gas cannot go from the gap 10 to the inner space 13 of the ceramic filter 5 without passing through the wall of the ceramic filter 5 because of the ring-shaped sealing members 6,7. The gas thus purified exits out from the outlet opening 3 of the case 1 and can be used as dry gas for semiconductors or the like.

If gas to be treated is hot the sealing by the sealing members may deteriorate because of heat deformation of the sealing members 6,7 or a difference in heat expansion between the ceramic filter 5 and the case 1. This can be prevented in the gas filter of the present invention since the spring 12 is always pressing the receiving member 8 to the effect of ensuring the close contact between the sealing members 6,7 and the ceramic filter 5.

An embodiment of the present invention has been explained above. The present invention, however, is not confined by any means to this embodiment. A number of variations and applications can be made based on the essential idea of the present invention.

Figure 4:
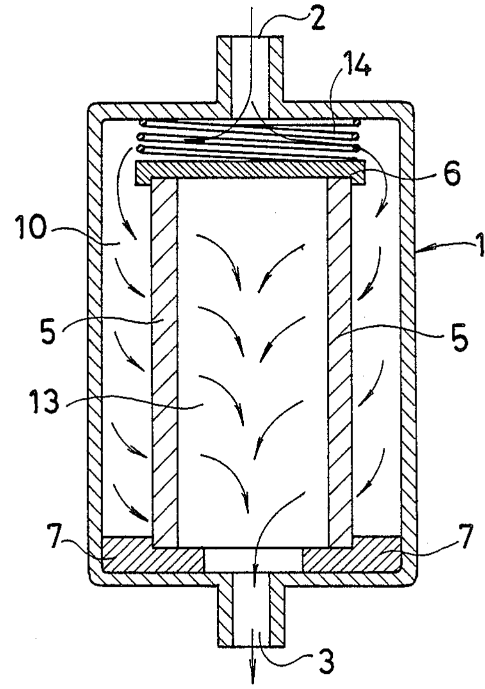

For example, the above embodiment uses the spring 12 placed in the receiving member 8 as a means for pressing the sealing members in a direction that ensures a tight sealing effect. The present invention, however, is not limited to this arrangement. FIG.4 shows another embodiment in which an elastic member 14 of a spring or a rubber piece or the like is placed directly on a sealing member 6 of a disk shape for pressing the sealing members 6,7 to secure tight sealing.

Figure 5:
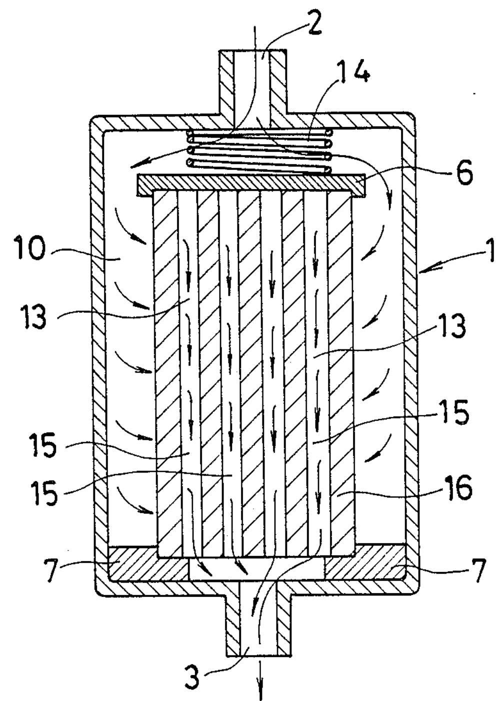
Figure 6A:
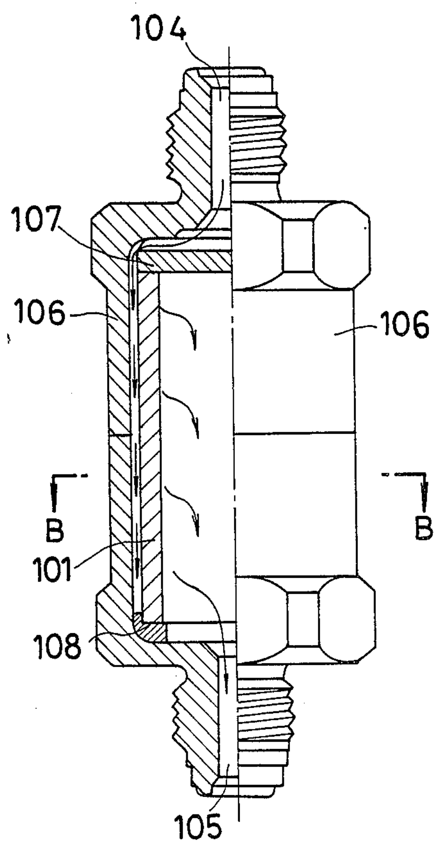
FIGS. 6 and 7 show conventional gas filters.
Figure 7A:
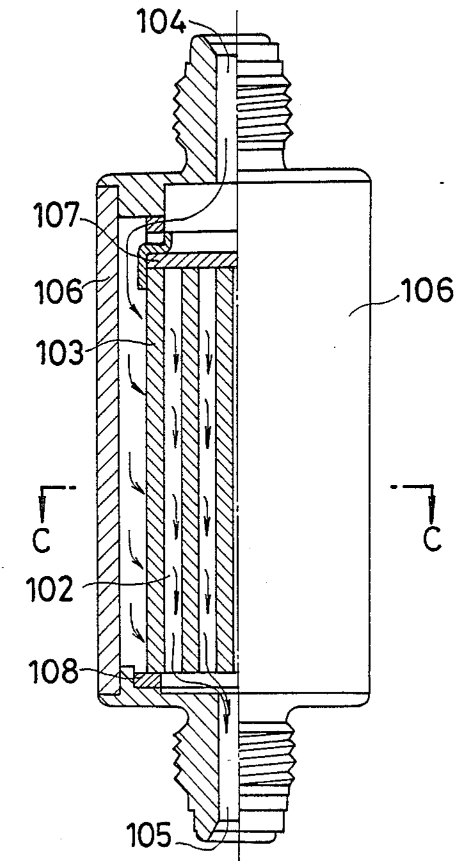
Figure 6B:
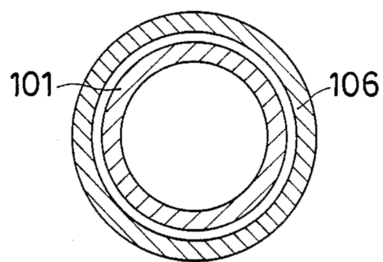
Figure 7B:
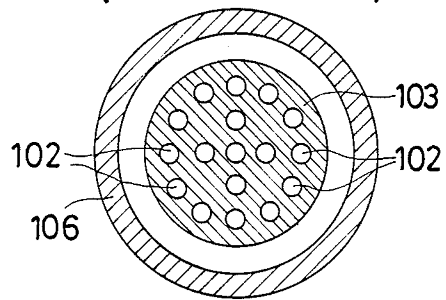

Also, although porous ceramic structural material formed into a cylindrical shape is used as a ceramic filter in the above embodiment, a cylindrical ceramic filter may be used which has a large number of flow holes 15 bored in it as shown in FIG.5.

Furthermore, the positions of the gas inlet and outlet openings 2,3 are not restricted to those of the above embodiment and can also be on the side wall of the case 1. In this case, however, the sealing members 6,7 also have to be placed in different positions accordingly, or their shapes be modified.

What is claimed is:

1. A gas filter, comprising:

a cylindrical casing having a first end with a gas inlet opening and a second end with a gas outlet opening;

a cylindrical ceramic filter arranged concentrically in said casing so that a clearance exists between said filter and said casing;

a first ring-shaped seal interposed between a first end of said ceramic filter and said casing;

a bottom-form cylindrical spring receiver having an open end with an external circumference on which a flange is provided, said flange being arranged outside a second end of said ceramic filter, a bottom end of said spring receiver being arranged concentrically within said ceramic filter so that a clearance exists between said spring receiver and said ceramic filter;

a second seal interposed between the second end of said ceramic filter and said flange of said spring receiver; and a spring arranged between the bottom of said spring receiver and said casing so as to urge said first seal and second seal in a direction of compression.

2. A gas filter as defined in claim 1, wherein said casing is formed of two cylindrical casings welded together in the proximity of the longitudinal center of the casing.

3. A gas filter as defined in claim 1, wherein said ceramic filter is a porous ceramic body.

4. A gas filter as defined in claim 1, wherein said first seal and said second seal are made of fluorine resin.

* * * * *